Feb. 28, 1950     R. C. ENSIGN     2,499,303
ANIMAL TRAP
Filed June 28, 1944     2 Sheets-Sheet 1
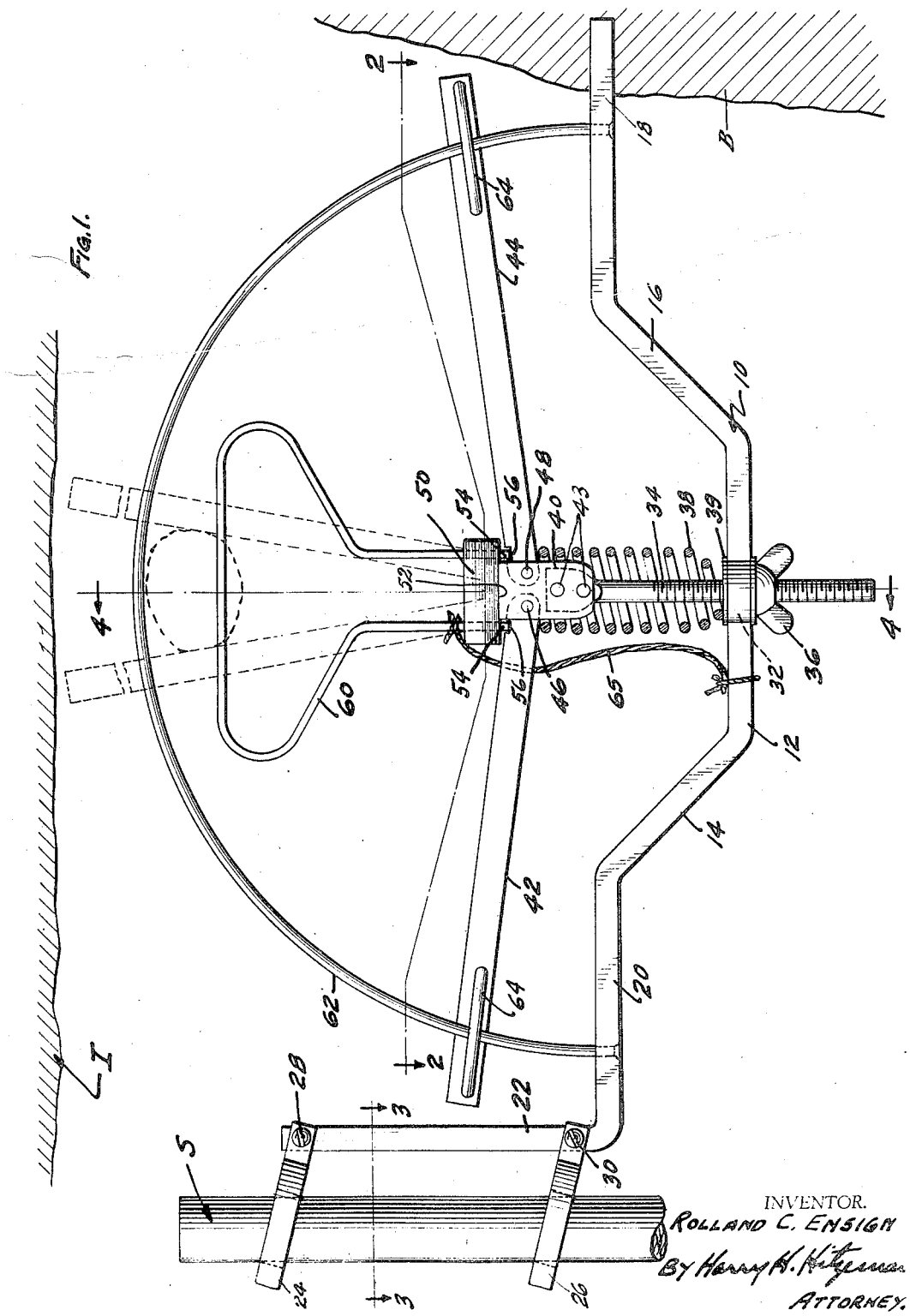
INVENTOR.
ROLLAND C. ENSIGN
By Harry H. Hitzeman
ATTORNEY.

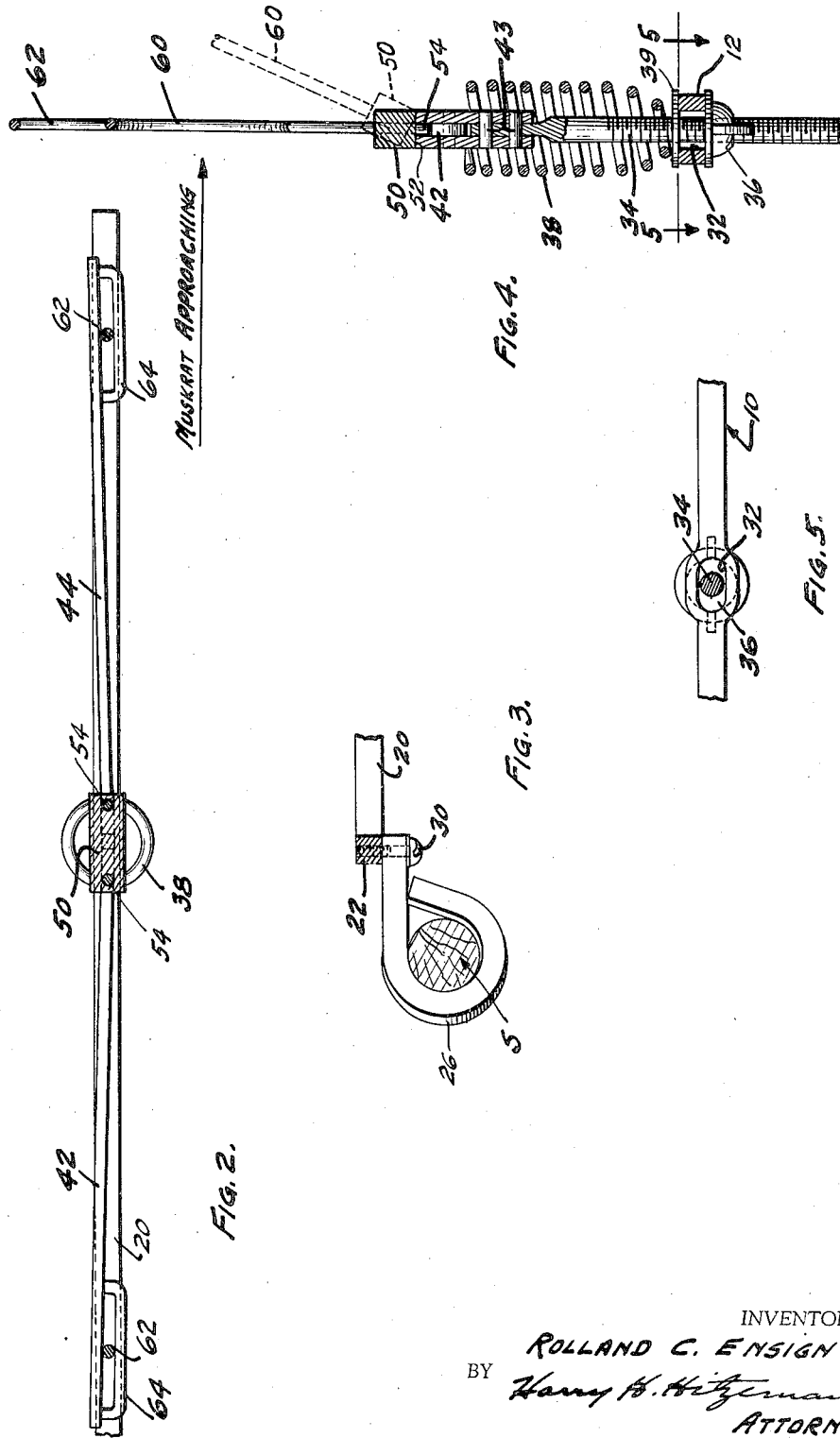

Patented Feb. 28, 1950

2,499,303

UNITED STATES PATENT OFFICE 2,499,303

ANIMAL TRAP

Rolland C. Ensign, West McHenry, Ill.

Application June 28, 1944, Serial No. 542,455

8 Claims. (Cl. 43—92)

My invention relates to improvements in animal traps and like devices. My invention relates more particularly to traps designed for use in catching muskrats and animals of similar habitat.

The principal object of the present invention is to provide a metal trap for the purpose described which can be placed in the paths under the ice, or in other paths or runways which are followed by muskrats or other animals of this type, and which is capable of being sprung by bodily contact with a movable trigger which presents itself as an obstacle in the path of the animal.

A further object of my invention is to provide a metal trap of the type described, having mechanism associated therewith for positioning the trap in any desired location in the runway of the animals, said positioning being done by the use of anchoring means attached to the frame of the trap and fastened about a post or stake which is driven or pushed into the ground.

A further object of the invention is to provide an animal trap of the type described which is comparatively simple in construction yet highly efficient, easily tripped by an animal and capable of long and hard usage without becoming broken or out of order.

A further object of the invention is to provide an animal trap of the type described constructed of comparatively few working parts and provided with a compressible spring mechanism for actuating the jaws to catch the animal.

A further object of the invention is to provide a trap of the type described which has tension adjusting means associated with the spring mechanism, so that any desired pressure within limits may be applied to the jaws to close them when the trap is sprung.

A further object of the invention is to provide a novel type of trigger or trap springing means which, when moved by the animal, permits the jaws to be sprung to catch the animal with the trigger mechanism dropping away from the vicinity of the jaws.

A further object of the invention is to provide in a trap of the type described a post having limited lateral movement upon which the jaws and trigger or trap springing means are positioned, which permits of movement to the right or left of the jaws in closing, thereby effecting more secure grasping of an animal caught in the trap.

Other objects and advantages will be more apparent from the following description wherein reference is had to the accompanying two sheets of drawings upon which:

Fig. 1 is a front elevational view of the trap in position in an animal runway with the spring broken into section to more clearly show the mounting post and associated parts.

Fig. 2 is a horizontal sectional view taken generally on the line 2—2 of Fig. 1.

Fig. 3 is a horizontal sectional view of the anchoring means and is taken generally on the line 3—3 of Fig. 1;

Fig. 4 is a sectional view through the mounting post and associated parts taken generally on the line 4—4 of Fig. 1, and Fig. 5 is a horizontal sectional view taken on the line 5—5 of Fig. 4.

In the embodiment of the invention which I have chosen to illustrate, I provide a frame member 10 constructed of square metallic rod material having a straight lower portion 12, a pair of angularly disposed upwardly extending arms 14 and 16 terminating in straight extensions 18 and 20. The extension 20 may have a vertically disposed portion 22 to which a pair of ring members 24 and 26 are pivotally connected by the screw members 28 and 30. The ring members 24 and 26 are adapted to be passed over a stake S which may be driven into the ground. By inclining the ring members at an angle, as shown, the frame of the trap may be disposed at the desired depth in the runway of the animal.

The lower portion 12 of the frame is provided with an elongated opening 32 through which a mounting post 34 is loosely passed. The post 34 is screw-threaded for a considerable distance, as shown, and may receive a wing nut 36 for the purpose of tightening the tension on the compression spring 38 which surrounds the same. The post 34 may carry a block 40 rigidly connected by pins 43 to the upper end of the post. The block 40 may have a pair of jaw members 42 and 44 pivotally mounted therein upon the pin members 46 and 48. The compression spring 38 is positioned surrounding the post 34 and block 40 between the jaws 42 and 44 and a washer 39 positioned on the upper surface of the portion 12 of the frame.

The trigger of trap-spring mechanism may include a block member 50 provided with the flat lower surface 52 and a pair of downwardly projecting lugs 54. The lugs 54 in the construction shown are the end portions of the wire frame 60 described hereinafter. In the set position of the trap the lugs 54 fit into notches 56 in the upper sides of the jaw members 42 and 44 with the flattened lower portion 52 of the block member resting on the upper edge of the block 40, thus holding the jaws apart while the trigger is in this position. The trigger may further include a generally triangularly shaped wire frame 60 which is suitably fastened to the block member 50 and extends upwardly to generally cover the area above the jaws and within the arcuate jaw guide 62 which is fastened at its opposite ends to the frame 10. A flexible wire cord 65 may be fastened to the trigger and have its opposite end secured to the frame 10, so that when the trigger is released, it will remain connected to the frame, although it has been dislodged and dropped from its operating position.

The jaw members 42 and 44 may each be provided with a wire loop 64 through which the guide 62 passes, thus permitting only limited sideways movement of the jaws. The wire loop also acts as a guide in setting the trap permitting the jaws to move up and down as the post is lowered. Also in removing the animal, it acts as a guide when the tension on the spring is relieved as the post is raised.

When it is desired to set the trap, the wing nut 36 is rotated counter-clockwise to relieve tension on the spring 38, so that the jaws can be separated. The trigger is then placed in the setting position shown in Fig. 1 on top of the block 40 and with the lugs 54 resting in the notches 56 of the jaws. By rotating the wing nut 36 in a clockwise direction, the spring 38 may be compressed to the desired tension for the purpose required. When an animal is coming down the runway as, for example, with the trap as shown in Fig. 1 beneath the ice I with the end 18 of the frame stuck into the bank B, or fastened in any other suitable way and the other end of the frame fastened at a desired height on the stake S, the animal in swimming along under the ice will encounter the triangular frame 60 of the trigger and in brushing against it will push the trigger off the jaws whereupon the compression spring 38 in pressing upward against the jaws will snap them toward a closed position catching some portion of the animal within the trap. The trigger will then fall, but will be prevented from being lost by reason of the flexible wire 65 which is attached to the frame 10. Thus, when the trap is to be set, tension upon the spring 38 is relieved by means of a wing nut 36; and after the trap has been set, the desired tension can be placed upon the spring by turning the wing nut forward on the post 34. The purpose of the elongated slot 32 through the frame 10 is to permit the movement of the post 34 sideways in both directions to a limited degree, thus giving greater flexibility to the trap than if the post were rigidly positioned in the frame 10.

While I have shown and described a specific embodiment of the invention, it will be apparent to those skilled in the art that modifications and changes may be made in the exact details shown and I do not wish to limit myself in any particular; rather what I desire to secure and protect by Letters Patent of the United States is:

1. An animal trap of the type described comprising a rigid frame having one end adapted to be fastened into the bank of a stream, the other end having an upright arm, a pair of anchoring means thereon for supporting said frame fixedly upon a rod positioned in the bed of a stream, a post having limited lateral movement medially disposed upon said frame, an arcuately shaped jaw guide fastened to said frame, a pair of jaws carried by said post, a compression spring disposed between a portion of said frame and said jaws, and a trigger for normally holding said jaws open, said trigger disposed within said jaw guide and capable of being dislodged from said jaws to permit said jaws to be closed by the action of said compression spring.

2. An animal trap of the type described comprising a rigid frame having one end adapted to be fastened into the bank of a stream, the other end having an upright arm, a pair of anchoring means thereon for supporting said frame fixedly upon a rod positioned in the bed of a stream, said anchoring means being ring members pivotally mounted on one side of said arm, a post having limited lateral movement medially disposed upon said frame, an arcuately shaped jaw guide fastened to said frame, a pair of jaws carried by said post, a compression spring disposed between a portion of said frame and said jaws, and a trigger for normally holding said jaws open, said trigger disposed within said jaw guide and capable of being dislodged from said jaws to permit said jaws to be closed by the action of said compression spring.

3. An animal trap of the type described comprising a rigid frame having one end adapted to be fastened into the bank of a stream, the other end having an upright arm, a pair of anchoring means thereon for supporting said frame fixedly upon a rod positioned in the bed of a stream, a post having limited lateral movement medially disposed upon said frame, the lower end of said post being screw-threaded, an arcuately shaped jaw guide fastened to said frame, a pair of jaws carried by said post, wire loops on said jaws enclosing said jaw guide, a compression spring disposed between a portion of said frame and said jaws, and a trigger for normally holding said jaws open, said trigger disposed within said jaw guide and capable of being dislodged from said jaws to permit said jaws to be closed by the action of said compression spring.

4. An animal trap of the type described comprising a rigid frame having one end adapted to be fastened into the bank of a stream, the other end having an upright arm, a pair of anchoring means thereon for supporting said frame fixedly upon a rod positioned in the bed of a stream, a post having limited lateral movement medially disposed upon said frame, the lower end of said post being screw-threaded, an arcuately shaped jaw guide fastened to said frame, a pair of jaws carried by said post, notches in said jaws, wire loops on said jaws enclosing said jaw guide, a compression spring disposed between a portion of said frame and said jaws, and a tiltable trigger for normally holding said jaws open, said trigger comprising a block having a pair of lugs engaging said notches to retain said jaws in an open position, said trigger disposed within said jaw guide and capable of being dislodged from said jaws to permit said jaws to be closed by the action of said compression spring.

5. An animal trap of the type described comprising a rigid frame having an upright arm, a pair of anchoring means thereon for supporting said frame fixedly at a desired position upon a stake fastened in the bed of a stream, a post having limited lateral movement medially disposed upon said frame, said post having a flat upper surface, a jaw guide fastened to said frame, a pair of jaws carried in the upper end of said post, notches in said jaws, wire members on said jaws around said jaw guide, a compression spring disposed between a portion of said frame and said jaws, means associated therewith for compressing said spring, and a trigger separate from the other parts of said trap for normally holding said jaws open, said trigger having a rectangular base and a generally triangularly shaped wire frame and disposed within said jaw guide, portions thereof engaging said notches to retain said jaws in an open position with a portion thereof resting upon the upper end of said post so that as said trigger is moved, it pivots on the edge of said post to release said jaws to be closed by the action of said spring.

6. An animal trap of the type described comprising a rigid frame having an upright arm, a pair of anchoring means thereon for supporting said frame fixedly at a desired position upon a stake fastened in the bed of a stream, a post having limited lateral movement medially disposed upon said frame, said post having a flat upper surface, a jaw guide fastened to said frame, a pair of jaws carried in the upper end of said post, notches in said jaws, wire members on said jaws around said jaw guide, a compression spring disposed between a portion of said frame and said jaws, means associated therewith for compressing said spring, a trigger separate from the other parts of said trap for normally holding said jaws open, said trigger having a rectangular base and a generally triangularly shaped wire frame and disposed within said jaw guide, portions thereof engaging said notches to retain said jaws in an open position with a portion thereof resting upon the upper end of said post so that as said trigger is moved, it pivots on the edge of said post to release said jaws to be closed by the action of said spring, and a flexible wire connecting said trigger to said rigid frame.

7. An animal trap of the type described comprising a rigid frame having one end adapted to be fastened into the bank of a stream, the other end having an upright arm, a pair of anchoring means thereon for supporting said frame fixedly upon a rod positioned in the bed of a stream, a post having limited lateral movement medially disposed upon said frame, an arcuately shaped jaw guide fastened to said frame, a pair of jaws carried by said post, a compression spring disposed between a portion of said frame and said jaws, a tiltable trigger for normally holding said jaws open, and means for compressing said spring after said trap is set by holding said jaws open, said trigger disposed within said jaw guide and capable of being dislodged from said jaws to permit said jaws to be closed by the action of said compression spring.

8. An animal trap of the type described comprising a rigid frame having one end adapted to be fastened into the bank of a stream, the other end having an upright arm, a pair of anchoring means thereon for supporting said frame fixedly at a desired position upon a stake fastened in the bed of a stream, a post having limited lateral movement medially disposed upon said frame, an arcuately shaped jaw guide fastened to said frame, a pair of jaws carried by said post, a compression spring disposed between a portion of said frame and said jaws, means associated therewith for compressing said spring, a trigger for normally holding said jaws open, said trigger being separate from the jaws of the animal trap, and a flexible wire for attaching the same to said frame, said trigger having a generally triangularly shaped form and disposed within said jaw guide and capable of being dislodged from said jaws to permit said jaws to be closed by the action of said compression spring.

ROLLAND C. ENSIGN.

REFERENCES CITED

The following references are of record in the file of this patent:

UNITED STATES PATENTS

| Number | Name | Date |
| --- | --- | --- |
| 546,428 | Norton | Sept. 17, 1895 |
| 589,640 | Cartier | Sept. 7, 1897 |
| 791,311 | Baugh | May 30, 1905 |
| 959,659 | Walter | May 31, 1910 |
| 1,201,427 | Angvick | Oct. 17, 1916 |
| 1,231,065 | Pues | June 26, 1917 |
| 1,464,748 | Crago | Aug. 14, 1923 |
| 2,252,405 | Navin | Aug. 12, 1941 |